US009510229B2

(12) United States Patent
Berggren et al.

(10) Patent No.: US 9,510,229 B2
(45) Date of Patent: Nov. 29, 2016

(54) SYSTEM, METHOD, AND COMPUTER PROGRAM PRODUCT FOR PROGRESSIVELY ADJUSTING AN OFFLOAD SETTING

(71) Applicant: Sony Corporation, Tokyo (JP)

(72) Inventors: Anders Berggren, Lund (SE); Rickard Ljung, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/443,883

(22) PCT Filed: Sep. 19, 2014

(86) PCT No.: PCT/EP2014/069984
§ 371 (c)(1),
(2) Date: May 19, 2015

(87) PCT Pub. No.: WO2016/041605
PCT Pub. Date: Mar. 24, 2016

(65) Prior Publication Data
US 2016/0088510 A1    Mar. 24, 2016

(51) Int. Cl.
*H04W 28/02* (2009.01)
*H04W 64/00* (2009.01)
(Continued)

(52) U.S. Cl.
CPC ......... *H04W 28/0226* (2013.01); *H04W 28/08* (2013.01); *H04W 36/32* (2013.01); *H04W 64/006* (2013.01); *H04W 84/12* (2013.01)

(58) Field of Classification Search
CPC ... H04W 48/14; H04W 48/08; H04W 40/22; H04W 88/04; H04W 72/00; H04W 88/10; H04W 28/0226; H04W 64/006; H04W 28/08; H04W 36/32

USPC .................................................. 370/230, 231
See application file for complete search history.

(56) References Cited

U.S. PATENT DOCUMENTS

2015/0124601 A1* 5/2015 Li ........................ H04W 28/08
  370/230
2016/0007271 A1* 1/2016 Plicanic
  Samuelsson ......... H04W 48/14
  455/426.1

FOREIGN PATENT DOCUMENTS

WO    2011149533 A1    12/2011

OTHER PUBLICATIONS

Toni Janevski et al., "Mobilit-based Traffic Offload from WiMAX to WLAN", Communications and vehicular technology in the Benelus (SCVT), 2012 IEEE 19th Symposium on, IEEE, Nov. 16, 2012, pp. 1-6, XP 032293649, DOI:10.1109/SCVT.2012.6399395, ISBN: 978-1-4673-2114-3.*

(Continued)

*Primary Examiner* — Afsar M Qureshi
(74) *Attorney, Agent, or Firm* — James C. Edwards; Moore & Van Allen PLLC

(57) ABSTRACT

The invention is directed to systems, methods and computer program products for progressively adjusting an offload setting for offloading a user equipment, UE (410), from a cellular network (420) to a wireless local area network, WLAN (430) or for offloading the UE (410) from the WLAN (430) to the cellular network (420). An exemplary method comprises determining a progressive increase or decrease in a mobility of the UE (410); and progressively adjusting an offload setting for the UE (410) based on the progressive increase or decrease in the mobility of the UE (410).

20 Claims, 4 Drawing Sheets

(51) Int. Cl.
H04W 28/08 (2009.01)
H04W 36/32 (2009.01)
H04W 84/12 (2009.01)

(56) References Cited

OTHER PUBLICATIONS

Haijun Zhang et al. "A Novel Handover Mechanism between Femtocell and Macrocell for LTE Based Networks", IEEE, Piscalaway, NJ, USA, Feb. 2010, pp. 228-231, XP031652552.*

Haijun Zhang et al., "A Novel Handover Mechanism Between Femtocell and Macrocell for LTE Based Networks", Communication Software and Networks, 2010, ICCSN '10. Second International Conference on, IEEE, Piscataway, NJ, USA, Feb. 26, 2010, pp. 228-231, XP031652552, ISBN: 978-1-4244-5726-7.

Toni Janevski et al., "Mobility-based traffic offload from WiMAX to WLAN", Communications and Vehicular Technology in the Benelux (SCVT), 2012 IEEE 19th Symposium on, IEEE, Nov. 16, 2012, pp. 1-6, XP032293649, DOI: 10.1109/SCVT.2012.6399395, ISBN: 978-1-4673-2114-3.

* cited by examiner

SYSTEM, METHOD, AND COMPUTER PROGRAM PRODUCT FOR PROGRESSIVELY ADJUSTING AN OFFLOAD SETTING

CROSS-REFERENCE TO THE RELATED APPLICATION

This application is a United States National Stage Application filed under 35 U.S.C. §371 of PCT Patent Application Serial No. PCT/EP2014/069984, filed on Sep. 19, 2014.

FIELD OF THE INVENTION

The present invention related to the field of telecommunications and, more specifically, progressively adjusting an offload setting for offloading a user equipment (UE) from a cellular network to a wireless local area network (WLAN) or from a WLAN to a cellular network.

BACKGROUND

Offloading refers to delivering data traffic associated with a network device from a cellular network to a complementary network in order to reduce congestion on the cellular network, or vice versa. There is a need to determine appropriate conditions for executing the offloading process.

BRIEF SUMMARY

Embodiments of the invention are directed to systems, methods and computer program products for progressively adjusting an offload setting for offloading a user equipment (UE) from a cellular network to a wireless local area network (WLAN) or for offloading the UE from the WLAN to the cellular network. An exemplary method comprises determining a progressive increase or decrease in a mobility of the UE; and progressively adjusting an offload setting for the UE based on the progressive increase or decrease in the mobility of the UE. As used herein, a UE's mobility refers to at least one of a speed, acceleration, current position, distance traveled by the UE, or direction of movement of the UE.

In some embodiments, the method further comprises adjusting the offload setting to a high mobility offload setting upon reaching a high mobility state, the high mobility state being reached when the mobility of the UE is equal to or greater than a threshold mobility.

In some embodiments, the cellular network is associated with a standardization specified by the $3^{rd}$ Generation Partnership Project (3GPP).

In some embodiments, the mobility comprises at least one of a speed, an acceleration, a current position, a distance, or a direction of movement.

In some embodiments, the UE comprises at least one of a gyrometer, an accelerometer, a compass, a global positioning system (GPS), a context awareness engine, or a mapping engine.

In some embodiments, the WLAN comprises an access point (AP), wherein the AP is mobile.

In some embodiments, the AP's mobility is substantially similar to the UE's mobility.

In some embodiments, progressively adjusting the offload setting causes progressive offloading of the UE from the cellular network to the WLAN or from the WLAN to the cellular network.

In some embodiments, the determining step is performed by the UE.

In some embodiments, the determining step is performed by at least one of the cellular network or the WLAN.

In some embodiments, the progressive increase or decrease in the mobility is determined based on determining a number of the UE's cell changes per unit time.

In some embodiments, the UE determines a delta value associated with each progressively higher mobility level, the delta value being used to set an incremental mobility threshold level.

In some embodiments, the UE comprises at least one of a mobile computing device, a non-mobile computing device, a mobile phone, a television, a watch, or a tablet computing device.

In some embodiments, a UE is provided for progressively adjusting an offload setting for offloading the UE from a cellular network to a WLAN or for offloading the UE from the WLAN to the cellular network. The UE comprises: a memory; a processor; and a module stored in the memory, executable by the processor, and configured to: determine a progressive increase or decrease in a mobility of the UE; and progressively adjust an offload setting for the UE based on the progressive increase or decrease in the mobility of the UE.

In some embodiments, a computer program product is provided for progressively adjusting an offload setting for offloading a UE from a cellular network to a WLAN or for offloading the UE from the WLAN to the cellular network. The computer program product comprises a non-transitory computer-readable medium comprising a set of codes for causing a computer to: determine a progressive increase or decrease in a mobility of the UE; and progressively adjust an offload setting for the UE based on the progressive increase or decrease in the mobility of the UE.

BRIEF DESCRIPTION OF THE DRAWINGS

Figure 1:
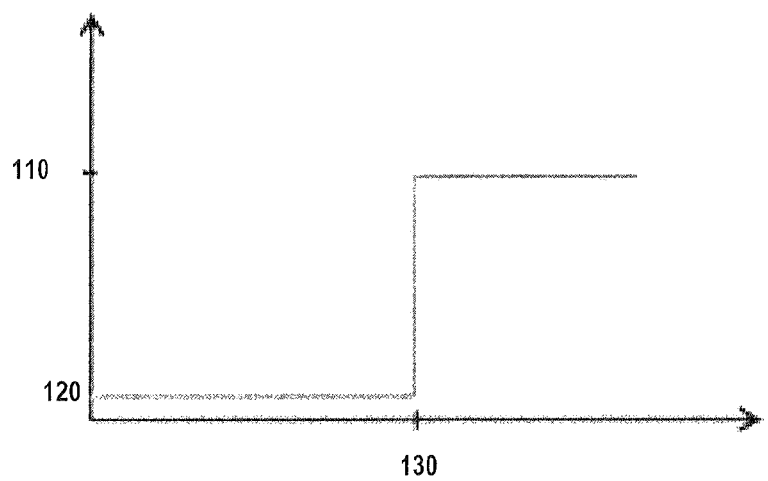
Figure 2:
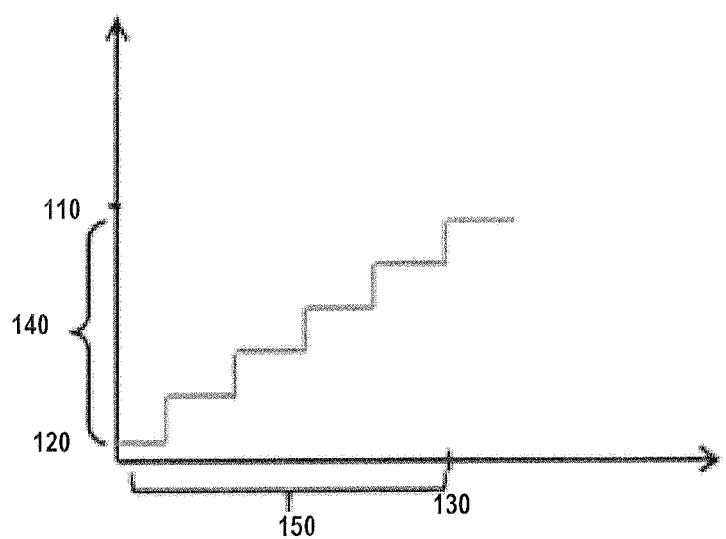
Figure 3:
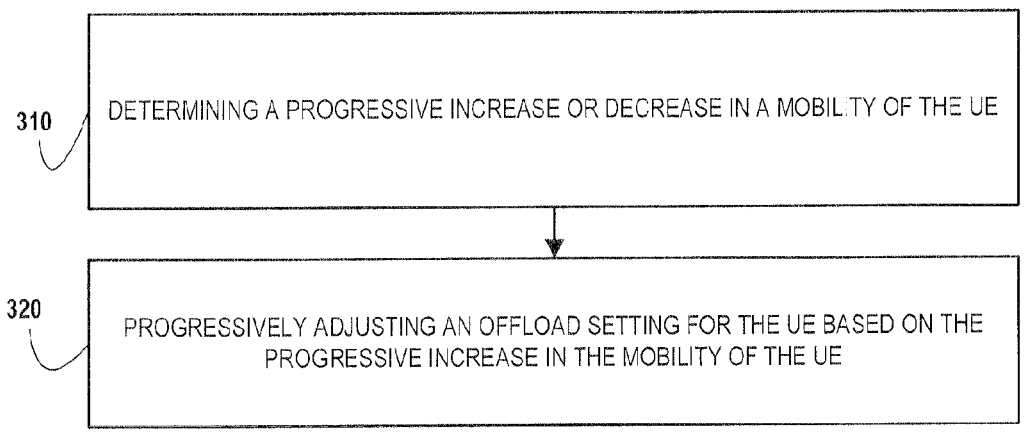
Figure 4:
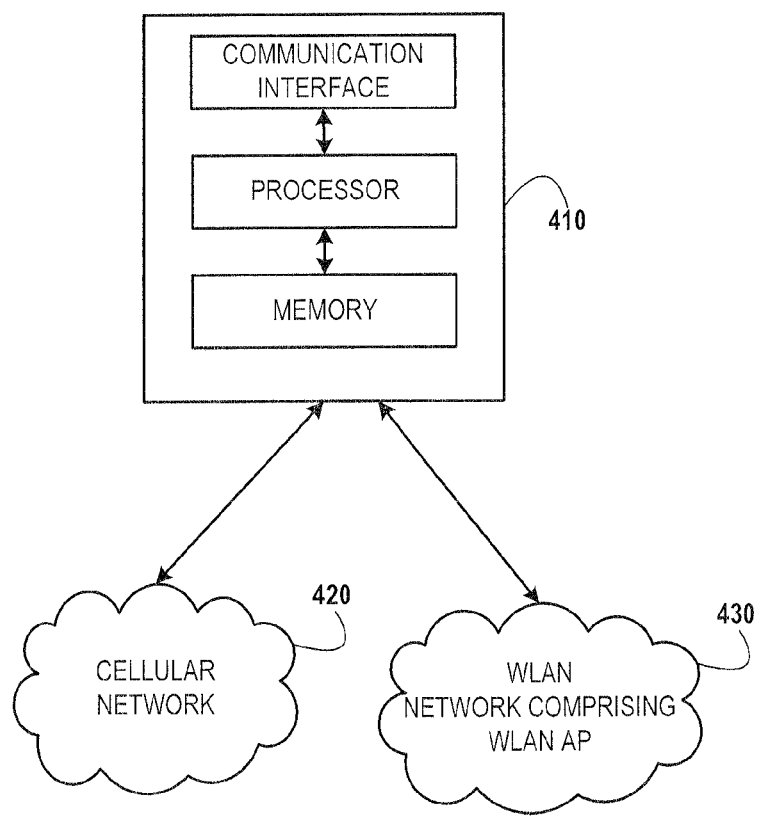

Having thus described embodiments of the invention in general terms, reference will now be made to the accompanying drawings, where:

FIG. 1 is an exemplary graph of offload parameter setting (y-axis) versus mobility detection (x-axis), in accordance with embodiments of the present invention;

FIG. 2 is an exemplary graph of offload parameter setting (y-axis) versus mobility detection (x-axis), in accordance with embodiments of the present invention;

FIG. 3 is an exemplary method for progressively adjusting an offload setting for offloading the UE from a cellular network to a WLAN or from the WLAN to the cellular network, in accordance with embodiments of the present invention;

FIG. 4 is an exemplary network environment, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A device may be referred to as a node or user equipment (UE). For the purpose of sending or receiving data, the device may connect to a wireless local area network (WLAN) or a cellular network (including evolution of $3^{rd}$ Generation Partnership Project (3GPP) releases and $5^{th}$ Generation (5G) releases). The WLAN comprises at least one access point (AP).

The main purpose of this invention is to determine whether it is preferable to (i) connect the UE to the WLAN AP over the cellular network because the UE has high mobility (e.g., equal to or greater than a first threshold mobility) relative to the cellular network (alternatively, to the WLAN AP) but has substantially no mobility or substantially low mobility (e.g., less than a second threshold mobility) relative to the WLAN AP (alternatively, to the cellular network) or (ii) connect the UE to the cellular network over the WLAN AP because the UE has high mobility (e.g., equal to or greater than a first threshold mobility) relative to the WLAN AP (alternatively, to the cellular network) but has substantially no mobility or substantially low mobility (e.g., less than a second threshold mobility) relative to the cellular network (alternatively, to the WLAN AP).

The present invention is directed to transitioning a UE between a normal state (e.g., when the UE is not moving or moving with a mobility less than a threshold mobility) and a high mobility state (e.g., when the UE is moving with a mobility equal to or greater than the threshold mobility). As used herein, a UE's mobility refers to at least one of a speed, acceleration, current position, distance traveled by the UE, or direction of movement of the UE. The UE's gyrometer, accelerometer, compass and/or satellite positioning capabilities (e.g. global positioning system (GPS) located in the UE) may be used to provide mobility data for the UE. Additionally, the UE may use context awareness engines (e.g., residing on the UE) and/or mapping engines (e.g., residing on the UE) to obtain the mobility data described herein.

The present invention enables the UE to more rapidly adjust its offload parameters to take into account the UE's mobility changes. Offloading refers to offloading a UE's data traffic from a cellular network (e.g., a 3GPP network) to a complementary network (e.g., a WLAN) in order to reduce congestion on the cellular network, but may also refer to offloading a UE's data traffic from a complementary network (e.g., a WLAN) to a cellular network (e.g., a 3GPP network) in order to reduce congestion on the complementary network. As used herein, a WLAN may refer to any alternative network that can be used to route data traffic to and from a UE instead of a cellular network. The present invention is directed to detecting the UE's mobility relative to the mobility of the WLAN AP, and to determine whether connecting the UE to the WLAN AP is more preferable (i.e., more efficient, faster, etc.) compared to connecting the UE to a cellular network.

The present invention enables detection of multiple mobility states for the UE. The mobility states may be associated with various threshold mobility levels. A high mobility state is when the UE has a mobility equal to or greater than a threshold mobility level. A normal mobility state is when the UE has a mobility less than the threshold mobility level or when the UE is stationary (no mobility). The present invention enables detection of multiple mobility states between the high mobility state and the normal mobility state. As indicated previously, the present invention is directed to detecting the UE's mobility relative to the mobility of the WLAN AP and/or a cellular network. With a dynamic transition between mobility states, a UE can adjust its offload parameters more rapidly (e.g., at a rate equal to or greater than a threshold rate). The offload parameters take into account the change in the UE's mobility state.

Referring now to FIG. 1, FIG. 1 presents a graph of offload parameter setting (y-axis) versus mobility detection (x-axis). As used herein, a state is associated with an offload setting. The high mobility state (associated with a high mobility offload parameter setting 110) is triggered when the mobility of the UE is determined to be equal to or greater than a threshold mobility 130. The normal mobility state (associated with a normal or low mobility offload parameter setting 120) is triggered when the mobility of the UE is determined be less than the threshold mobility 130. Therefore, as indicated in FIG. 1, the UE switches between a high mobility state and a normal mobility state based on the mobility of the UE. The mobility is associated with or is a function of the number of active cell changes made by the UE per unit time. As a UE moves through a physical space, it may switch from a first cell associated with a cellular network (receiving and sending data to an AP or base station associated with the first cell) to a second cell associated with the cellular network (receiving and sending data to an AP or base station associated with the second cell). A first threshold number of cell changes or switches may be associated with a high mobility state. When the first threshold number of cell changes is detected by the UE, the UE enters a high mobility state which triggers a high mobility offload setting. When the high mobility offload setting is triggered, the UE detects that that the WLAN AP is relatively stationary (or has substantially no or low mobility) with respect to the UE, which makes the UE select the WLAN AP over the cellular network for receiving and sending data (i.e., routing data traffic). In some embodiments, the WLAN AP has a mobility that is similar to (or same as) the UE. In other embodiments, the WLAN AP is also mobile, but has a mobility different (e.g., less than or greater than) from the UE's mobility.

Referring now to FIG. 2, FIG. 2 presents another graph of offload parameter setting (y-axis) versus mobility detection (x-axis). As used herein, a state is associated with an offload setting. The high mobility state (associated with a high mobility offload parameter setting 110) is triggered when the mobility of the UE is determined to be equal to or greater than a threshold mobility 130. However, for this embodiment, a progressive adjustment towards the high mobility state (and progressive adjustment towards higher mobility offload parameter settings 140) is possible. The present invention enables detection of multiple mobility states 150, from a zero or normal mobility state (associated with a zero or normal mobility offload parameter setting 120) to a high mobility state, each mobility state being associated with a higher mobility than a preceding mobility state. Each progressively higher mobility state is associated with a different offload setting. Therefore, the present invention enables dynamic detection of multiple mobility states, and dynamic adjustment of offload settings associated with each mobility state. As used herein, the term "dynamic" refers to rapid, progressive, or substantially instantaneous detection of multiple mobility states, and rapid, progressive, or substantially instantaneous adjustment of offload settings associated with each mobility state.

A network may have defined threshold mobility states that are used for offloading a UE from a cellular network to a WLAN or from the WLAN to the cellular network. A UE may apply delta values to these defined threshold mobility states, resulting in progressive mobility states as indicated in FIG. 2. The delta value is based on the mobility of the UE, which, in turn, is based on the number of cellular network cell changes per unit time executed by the UE. For example, a first number of cell changes per unit time is associated with a first delta value, and a second, higher number of cell changes per unit time is associated with a second delta value. In the event that the WLAN AP is found more suitable than the cellular network for exchanging data with the UE, the present invention ensures that the higher the mobility of the UE, the lower the amount of data that the UE sends and receives on the cellular network, and the higher the amount of data that the UE sends and receives on a WLAN. The dynamic transition of the UE through the various mobility states may be controlled by at least one of the UE, the cellular network, or the WLAN.

In addition to mobility data for a UE, when deciding to offload the UE from the cellular network to a WLAN or from the WLAN to the cellular network, the UE may also need to consider network topology (of the cellular network and/or the WLAN), possible radio propagation conditions, relative location of UE with respect to the WLAN AP, UE's power data (e.g., power consumed being equal to or greater than a threshold power, power remaining being less than a threshold power, etc.), UE's current bandwidth utilization (e.g., bandwidth utilization equal to or greater than a threshold utilization), current and/or future needs (e.g., a bandwidth need that is equal to or greater than a certain capacity), etc. Radio link metrics, such as received signal strength indication (RSSI) metrics associated with the WLAN AP may also be considered in determining when and how to offload the UE from the cellular network to the WLAN or from the WLAN to the cellular network, and is also considered in selecting a particular WLAN AP from a plurality of WLAN APs that are in a detectable communication range of the UE. Any function described herein that is performed by the UE may be alternatively or additionally performed by the WLAN AP or cellular network.

Referring now to FIG. 3, FIG. 3 presents an exemplary method for progressively adjusting an offload setting for offloading a UE from a cellular network (e.g., based on 3GPP) to a WLAN. At step 310, the method comprises determining, by at least one of the UE, cellular network, or WLAN AP, a progressive increase or decrease in a mobility of the UE. The progressive increase or decrease in the mobility is determined based on determining a number of the UE's cell changes (e.g., on the cellular network) per unit time. At step 320, the method comprises progressively adjusting an offload setting for the UE based on the progressive increase or decrease in the mobility of the UE. Progressively adjusting the offload setting causes progressive offloading of the UE from the cellular network to the WLAN, or from the WLAN to the cellular network. In some embodiments, at least one of the UE, the cellular network, or the WLAN AP determines a delta value associated with each progressively higher mobility level, the delta value being used to set an incremental mobility threshold level. The method further comprises adjusting the offload setting to a high mobility offload setting upon reaching the high mobility state. The WLAN comprises a mobile AP, wherein the AP's mobility may be substantially similar to the UE's mobility.

Although the examples provided in the specification has been described with respect to adjusting an offload setting based on determining an increase in mobility, the specification can also be adapted to adjusting an offload setting based on determining a decrease in mobility of the UE. Determining an increase or decrease in mobility of the UE can lead to either delivering data traffic for the UE from the cellular network to the WLAN, or from the WLAN to the cellular network.

In some embodiments, the mobility comprises at least one of a speed, an acceleration, a current position, a distance, or a direction of movement associated with the UE. In some embodiments, the UE comprises at least one of a gyrometer, an accelerometer, a compass, a global positioning system (GPS), a context awareness engine, or a mapping engine. In some embodiments, the UE comprises at least one of a mobile computing device, a non-mobile computing device, a mobile phone, a television, a watch, or a tablet computing device.

Referring now to FIG. 4, FIG. 4 presents an exemplary block diagram of the network environment, in accordance with embodiments of the present invention. As illustrated, the network environment includes a cellular network 420, a WLAN 430, and a UE 410. As shown in FIG. 4, the UE 410 is operatively and selectively connected (e.g., via one or more wired or wireless mechanisms) to the cellular network 420 and the WLAN 430, which may include one or more separate networks. The WLAN 430 is associated with the WLAN AP. As described herein, when a network is described as performing a function, the network backbone, base station, or access point (AP) associated with the network performs the function.

The UE 410 in FIG. 4 includes a processor, a memory, and a module stored in the memory, executable by the processor, and configured to perform the various processes described herein, including the capability to communicate with other devices on any network presented in FIG. 4.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The invention is not limited to any particular types of UEs. As used herein, a UE may also be referred to as a device, a system, or apparatus. Examples of UEs include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for progressively adjusting an offload setting for offloading a user equipment, UE, from a cellular network to a wireless local area network, WLAN, or for offloading the UE from the WLAN to the cellular network, the method comprising:
   determining a progressive increase or decrease in a mobility of the UE; and
   progressively adjusting an offload setting for the UE based on the progressive increase or decrease in the mobility of the UE,
   wherein the offload setting defines a first amount of data that the UE sends and receives on the cellular network and a second amount of data that the UE sends and receives on the WLAN.

2. The method of claim 1, further comprising adjusting the offload setting to a high mobility offload setting upon reaching a high mobility state, the high mobility state being reached when the mobility of the UE is equal to or greater than a threshold mobility.

3. The method of claim 1, wherein the cellular network is associated with a standardization specified by the 3rd Generation Partnership Project (3GPP).

4. The method of claim 1, wherein the mobility comprises at least one of a speed, an acceleration, a current position, a distance, or a direction of movement.

5. The method of claim 1, wherein the UE comprises at least one of a gyrometer, an accelerometer, a compass, a global positioning system (GPS), a context awareness engine, or a mapping engine.

6. The method of claim 1, wherein the WLAN comprises an access point, AP, wherein the AP is mobile.

7. The method of claim 6, wherein the AP's mobility is substantially similar to the UE's mobility.

8. The method of claim 1, wherein progressively adjusting the offload setting causes progressive offloading the UE from the cellular network to the WLAN.

9. The method of claim 1, wherein progressively adjusting the offload setting causes progressive offloading of the UE from the WLAN to the cellular network.

10. The method of claim 1, wherein the determining step is performed by the UE.

11. The method of claim 1, wherein the determining step is performed by at least one of the cellular network or the WLAN.

12. The method of claim 1, wherein the progressive increase or decrease in the mobility is determined based on determining a number of the UE's cell changes per unit time.

13. The method of claim 1, wherein the UE determines a delta value associated with each progressively higher mobility level, the delta value being used to set an incremental mobility threshold level.

14. The method of claim 1, wherein the UE comprises at least one of a mobile computing device, a non-mobile computing device, a mobile phone, a television, a watch, or a tablet computing device.

15. A user equipment, UE, for progressively adjusting an offload setting for offloading the UE from a cellular network to a wireless local area network, WLAN, or for offloading the UE from the WLAN to the cellular network, the apparatus comprising:
   a memory;
   a processor; and
   a module stored in the memory, executable by the processor, and configured to:
   determine a progressive increase or decrease in a mobility of the UE; and
   progressively adjust an offload setting for the UE based on the progressive increase or decrease in the mobility of the UE,
   wherein the offload setting defines a first amount of data that the UE sends and receives on the cellular network and a second amount of data that the UE sends and receives on the WLAN.

16. The UE of claim 15, wherein the mobility comprises at least one of a speed, an acceleration, a current position, a distance, or a direction of movement.

17. The UE of claim 15, wherein the UE comprises at least one of a gyrometer, an accelerometer, a compass, a global positioning system (GPS), a context awareness engine, or a mapping engine.

18. The UE of claim 15, wherein the UE comprises at least one of a mobile computing device, a non-mobile computing device, a mobile phone, a television, a watch, or a tablet computing device.

19. A computer program product for progressively adjusting an offload setting for offloading a user equipment, UE, from a cellular network to a wireless local area network, WLAN, or for offloading the UE from the WLAN to the cellular network, the computer program product comprising:
   a non-transitory computer-readable medium comprising a set of codes for causing a computer to:
   determine a progressive increase or decrease in a mobility of the UE; and
   progressively adjust an offload setting for the UE based on the progressive increase or decrease in the mobility of the UE,
   wherein the offload setting defines a first amount of data that the UE sends and receives on the cellular network and a second amount of data that the UE sends and receives on the WLAN.

20. The computer program product of claim 19, wherein the mobility comprises at least one of a speed, an acceleration, a current position, a distance, or a direction of movement.

* * * * *